United States Patent
Maekawa

(10) Patent No.: US 8,542,953 B2
(45) Date of Patent: *Sep. 24, 2013

(54) IMAGE PROCESSING APPARATUS AND IMAGE PROCESSING METHOD

(75) Inventor: Koji Maekawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/523,069

(22) Filed: Jun. 14, 2012

(65) Prior Publication Data

US 2012/0251004 A1 Oct. 4, 2012

Related U.S. Application Data

(63) Continuation of application No. 11/238,695, filed on Sep. 29, 2005, now Pat. No. 8,224,131.

(30) Foreign Application Priority Data

Oct. 4, 2004 (JP) ................................ 2004-291449

(51) Int. Cl.
  *G06K 9/20* (2006.01)
  *G06K 9/18* (2006.01)
  *G06K 9/00* (2006.01)
(52) U.S. Cl.
  USPC ........... 382/321; 382/182; 382/185; 382/186; 382/187; 382/188; 382/189
(58) Field of Classification Search
  USPC .................................. 382/182, 185–189, 321
  See application file for complete search history.

(56) References Cited

U.S. PATENT DOCUMENTS

| | | | | |
|---|---|---|---|---|
| 5,841,901 A | * | 11/1998 | Arai et al. ..................... | 382/187 |
| 7,464,334 B2 | * | 12/2008 | Miller et al. .................. | 715/700 |
| 2004/0189721 A1 | * | 9/2004 | Pettiross et al. .............. | 345/863 |
| 2004/0260536 A1 | * | 12/2004 | Hwang ............................. | 704/9 |
| 2005/0024679 A1 | * | 2/2005 | Yoda et al. .................... | 358/1.15 |
| 2005/0102620 A1 | * | 5/2005 | Seto et al. ..................... | 715/541 |
| 2005/0177358 A1 | * | 8/2005 | Melomed et al. ................ | 704/2 |

* cited by examiner

*Primary Examiner* — Anand Bhatnagar
*Assistant Examiner* — Soo Park
(74) *Attorney, Agent, or Firm* — Canon USA, Inc., IP Division

(57) ABSTRACT

An image processing apparatus supports image processing in multiple languages via a user interface, a determining unit, a setting unit, and a character recognizing unit. The user interface sets an instruction from a user for various functions performed by the image processing apparatus. The user interface displays characters in a language. The determining unit automatically determines the language currently used for the characters displayed in the user interface of the various functions. The setting unit sets, in response to the determining unit automatically determining the language currently used for the characters displayed in the user interface, the determined language as a scanned document language for use in recognizing characters in a scanned document which is obtained by scanning a paper document. The character recognizing unit utilizes the scanned document language set by the setting unit to recognize characters in the scanned document and create text data.

20 Claims, 8 Drawing Sheets

IMAGE PROCESSING APPARATUS AND IMAGE PROCESSING METHOD

CROSS REFERENCE TO RELATED APPLICATIONS

The present application is a continuation of U.S. patent application Ser. No. 11/238,695, filed on Sep. 29, 2005, which claims priority from Japanese Application No. 2004-291449 filed Oct. 4, 2004, all of which are hereby incorporated by reference herein in their entirety.

BACKGROUND OF THE INVENTION

1. Field of the Invention

The present invention relates to an image processing apparatus and an image processing method for processing image data obtained by optically reading paper documents.

2. Description of the Related Art

It has been suggested to scan in paper documents so as to obtain image data of such documents, recognize characters of the image data so as to form a text file, and store the text file and the image data in such a way that they are associated with each other (see, for example, Japanese Patent Laid-Open No. 8-063583). This method enables a user to retrieve a desired image by using a character.

Recently, more and more people who use different languages have been using the same product. In addition, products have been increasingly distributed over the world, and reduction in the cost of manufacturing has been required. Therefore, it is necessary that one product support different (multiple) languages.

However, Japanese Patent Laid-Open No. 8-063583 does not discuss how to support different languages.

SUMMARY OF THE INVENTION

The present invention facilitates proper and easy character recognition suitable for a used language.

According to an aspect of the present invention, an image processing apparatus to support image processing in multiple languages includes a user interface configured to set an instruction from a user for various functions performed by the image processing apparatus, wherein the user interface displays characters in a language, a determining unit configured to automatically determine the language currently used for the characters displayed in the user interface of the various functions, a setting unit configured to set, in response to the determining unit automatically determining the language currently used for the characters displayed in the user interface, the determined language as a scanned document language for use in recognizing characters in a scanned document which is obtained by scanning a paper document, and a character recognizing unit configured to utilize the scanned document language set by the setting unit to recognize characters in the scanned document and create text data.

Therefore, the present invention can facilitate proper and easy settings of character recognition. In particular, for an image processing apparatus having a scanner, since a language used in character recognition is set in accordance with a language used in a user interface for providing the image processing apparatus with instructions to perform scanning and the like, settings of the character recognition can be properly and easily performed.

Further features of the present invention will become apparent from the following description of exemplary embodiments (with reference to the attached drawings).

DESCRIPTION OF THE EMBODIMENTS

First Embodiment

Figure 1:
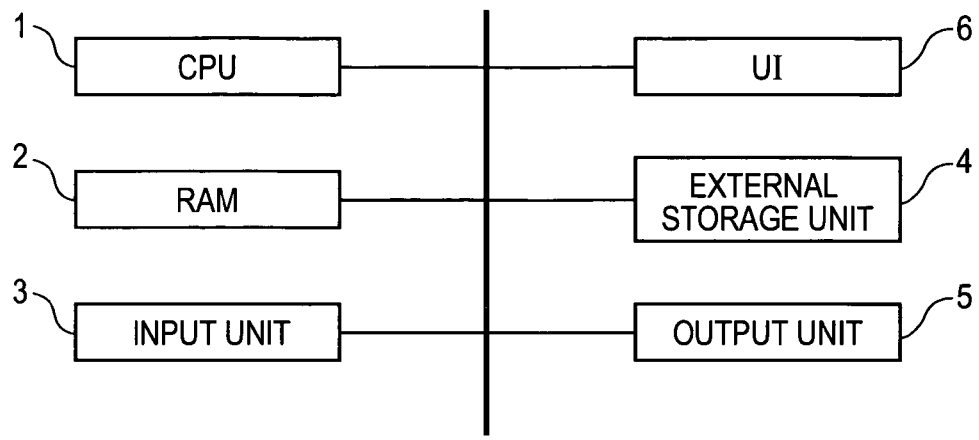
FIG. 1 shows the structure of an information processing apparatus according to an exemplary embodiment of the present invention.

FIG. 1 is a block diagram of an image processing apparatus according to an exemplary embodiment of the present invention. In this exemplary embodiment, a copier (multifunction peripheral (MFP)) is used as the image processing apparatus.

Image data read by an input unit 3 (e.g., scanner) is supplied to a memory area, such as a random access memory (RAM) 2. Similarly, a processing program for realizing the present invention and dictionary data stored in an external storage unit 4, such as a hard disk drive (HDD), a read-only memory (ROM), and the like, are supplied to the RAM 2, and the processing program is executed by a central processing unit (CPU) 1. In this exemplary embodiment, the present invention is realized by the execution of the processing program by the CPU 1. However, the present invention is not limited to this structure. The present invention may be realized by performing processing in part or in entirety by hardware, such as an electronic circuit.

When the processing program is executed by the CPU 1, then image data input from the input unit 3 is processed. The processed image data can be transmitted from an output unit 5 to an external device over a network, and can be stored in the external storage unit 4. The output unit 5 includes a printer. Therefore, in order to make a copy of a paper document, a document image created by reading the paper document with the scanner can be printed by the printer.

A user interface (UI) 6 is used for providing various instructions to the image processing apparatus from a user. In this exemplary embodiment, the user interface 6 is composed of a touch panel. However, the user interface 6 is not limited to the touch panel. For example, the user interface 6 may be composed of a combination of a display screen and one or more mechanical buttons. The user interface 6 supports multiple languages, and the language of the user interface 6 can be switched in response to a setting.

Figure 3:
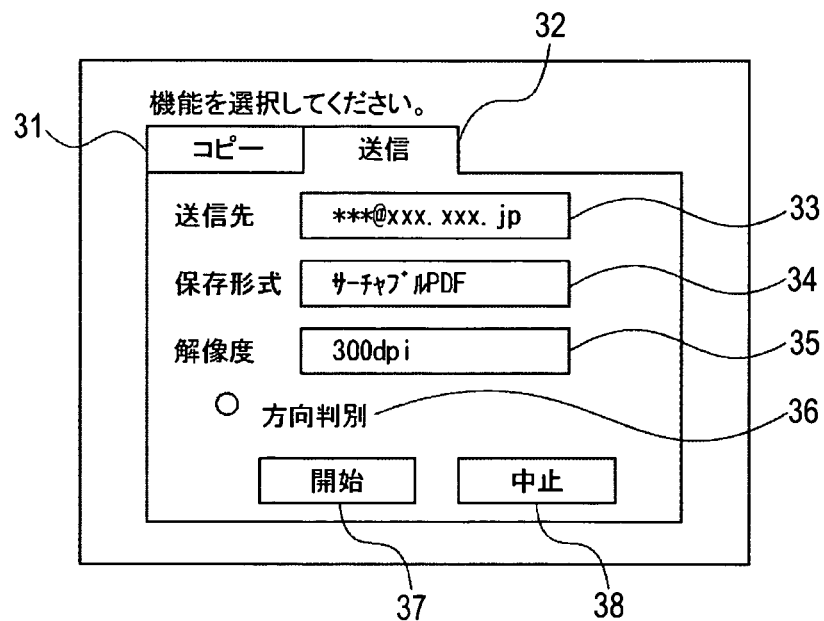
FIG. 3 shows a user interface in Japanese according to the exemplary embodiment of the present invention.
Figure 9:
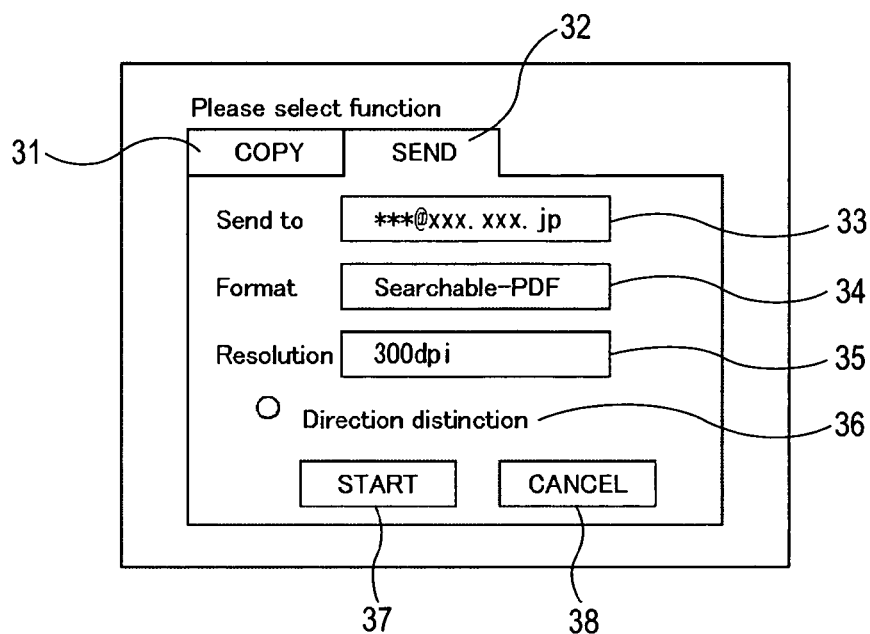
FIG. 9 shows a user interface in English according to the exemplary embodiment of the present invention.

Examples of the user interface are shown in FIGS. 3 and 9. FIG. 3 shows a user interface that is set so as to be displayed in Japanese. FIG. 9 shows a user interface that is set so as to be displayed in English.

In FIGS. 3 and 9, user interface controls, such as buttons, tabs, and boxes which perform the same functions have the same reference numerals 31 to 38. The details of each button, tab, and box are described below. When a user selects a Copy tab 31, which relates to a copying function, a screen for performing various settings about the copying function is then displayed. For example, on this screen, the user can set reduction and enlargement in copying, a desired scaling factor, double-sided copying, the number of copies, and the like.

The user interfaces shown in FIGS. 3 and 9 indicate screens appearing when the user selects a Send tab 32, which relates to a sending function. On this screen, the user can specify sending information used for sending document data read by, for example, a scanner to the outside.

An Address Setting box 33 is used for specifying a mail address, a path of a host to be sent, or the like. The mail address or the like is input or selected by the user.

Using a Format Setting box 34, the user can specify an image format to save an output file to be sent. Examples of such formats include tagged image file format (TIFF), portable document format (PDF), and searchable PDF. Searchable PDF (SPDF) used in this exemplary embodiment indicates the format realized by storing image data as a PDF file in which character codes obtained by recognizing characters of the image data are embedded as transparent text. Therefore, searchable PDF files are image data from their appearances, but they include embedded character codes associated with character images in the image data, thus allowing retrieval by using a character.

With a Resolution Setting box 35, the user can set the resolution of image data.

When a Direction Distinction button 36 is selected, the direction distinction processing of automatically determining the correct orientation of the image data and adjusting the current orientation of the image data to the correct orientation is then performed.

When a Start button 37 is selected, the image data is then read, and image processing based on the items specified using the boxes or button 33 to 36 is performed.

When a Cancel button 38 is selected, the settings described above are canceled, or if image processing is already started in response to the press of the Start button 37, the image processing is discontinued.

In this exemplary embodiment, the sending function is selected, "***@xxx.xxx.jp" is set as the address to be sent, "searchable-PDF" is set as the format, and "300 dpi" is set as the resolution for input images. The procedural steps of processing in this exemplary embodiment are described below with reference to the flowchart of FIG. 2.

Figure 2:
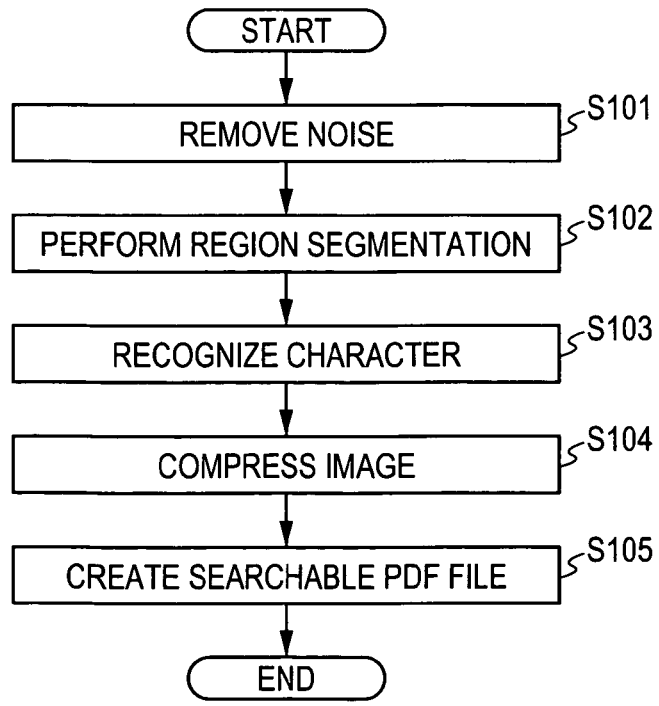
FIG. 2 shows a flowchart according to the exemplary embodiment of the present invention.

In step S101 of FIG. 2, read original image data is binarized, and the binarized image data is subjected to noise reduction, thus preparing image data for character recognition.

Figure 4:
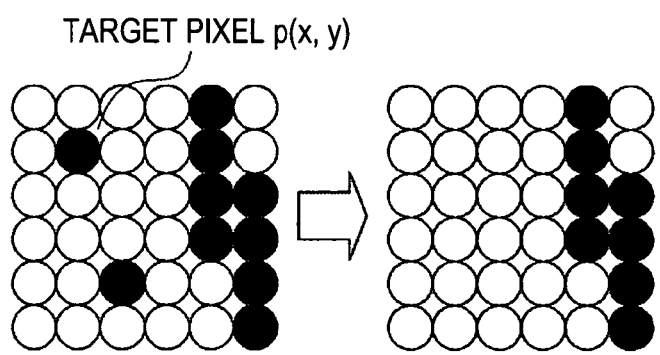
FIG. 4 illustrates noise reduction by removing an isolated point.

Noise reduction is performed using a technique of removing an isolated point. As shown in FIG. 4, when a target black point has no black information at its adjacent points, the target point is determined to be noise and is then removed. Specifically, with respect to a target pixel p (x, y) shown in FIG. 4, when none of the pixel information at its adjacent pixels (x, y−1), (x, y+1), (x−1, y−1), (x−1, y), (x−1, y+1), (x+1, y−1), (x+1, y), and (x+1, y+1) indicates black (ON), the target pixel is an isolated point. Therefore, the target pixel is determined to be noise, and the pixel information of the target pixel is thus changed to white (OFF).

In step S102, region segmentation is performed. In this region segmentation, the binarized image data is divided into areas by attributes (e.g., character area, image area), and the structure of each area is analyzed. Then, position information and an area attribute are added to each area.

Figure 5:
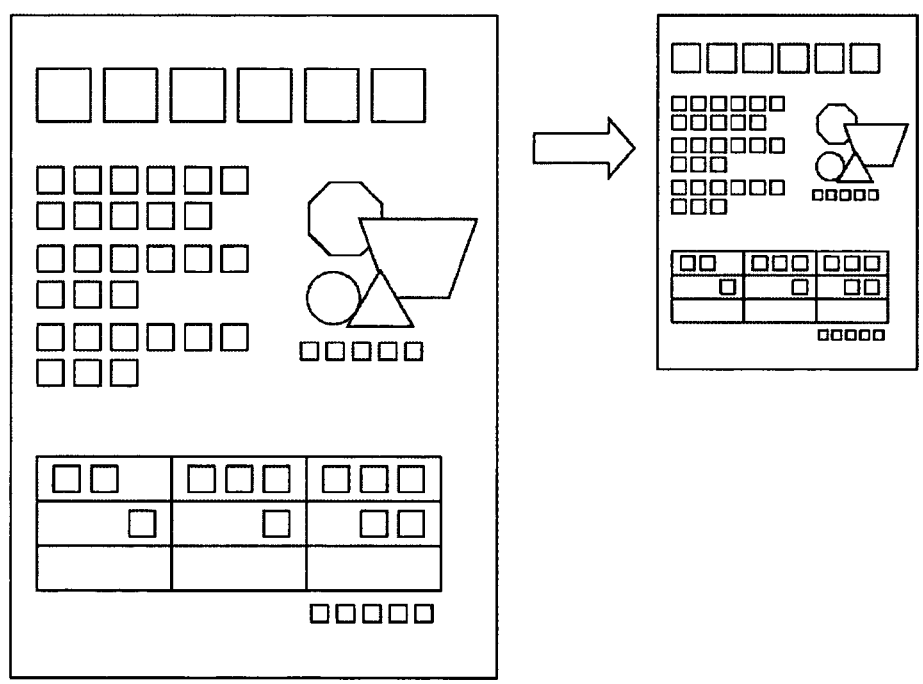
FIG. 5 illustrates region segmentation.
Figure 6:
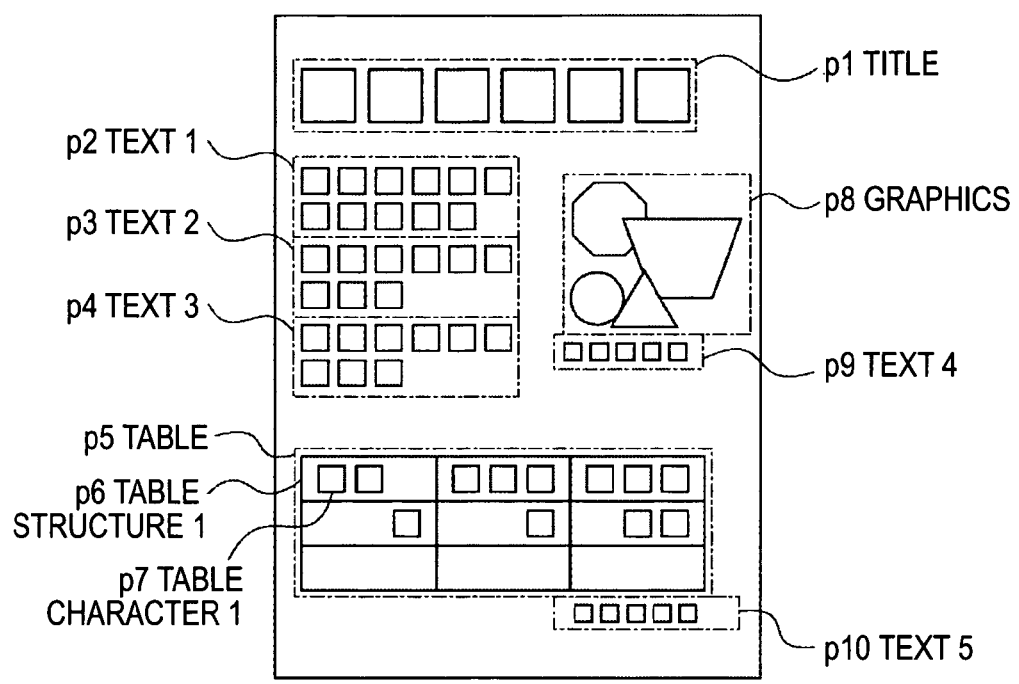
FIG. 6 shows a result (layout information) of the region segmentation.
Figure 7:
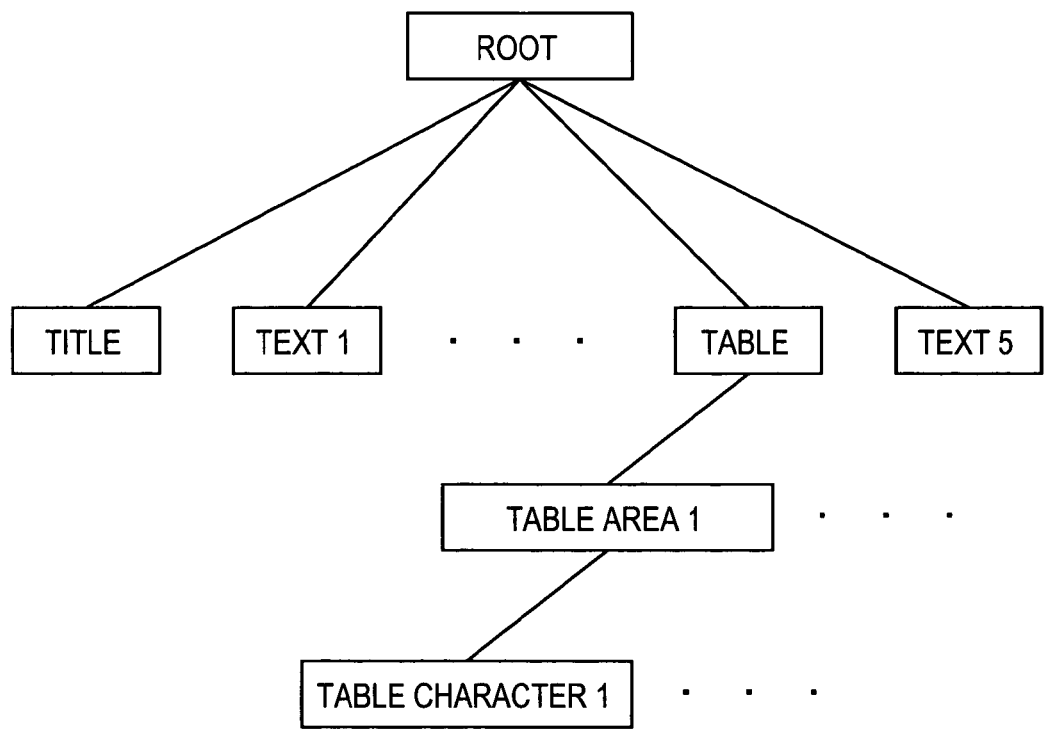
FIG. 7 shows a result (logical structure) of the region segmentation.

Since the region segmentation (step S102) can use conventional techniques, a brief explanation is provided here. In the region segmentation, input image data is reduced, and a cluster of pixels is extracted as one image area from the reduced image data. FIG. 5 shows a case in which image data is reduced and image areas for clusters of pixels are extracted. From the size of each extracted image area, the placement thereof, the size consistency thereof, and the like, a text area and an image area are determined. In FIG. 6, the areas divided by the region segmentation are indicated by the dotted lines, and the area attributes are shown by p1 to p10. As a result of performing such region segmentation, with respect to each area having a certain number of pixels, an attribute (e.g., title, text, graphics, and table) and the position information and the size of each image area are obtained. In addition, as shown in FIG. 7, the layout of the image data is analyzed, and the logical structure of each area is obtained.

Figure 8:
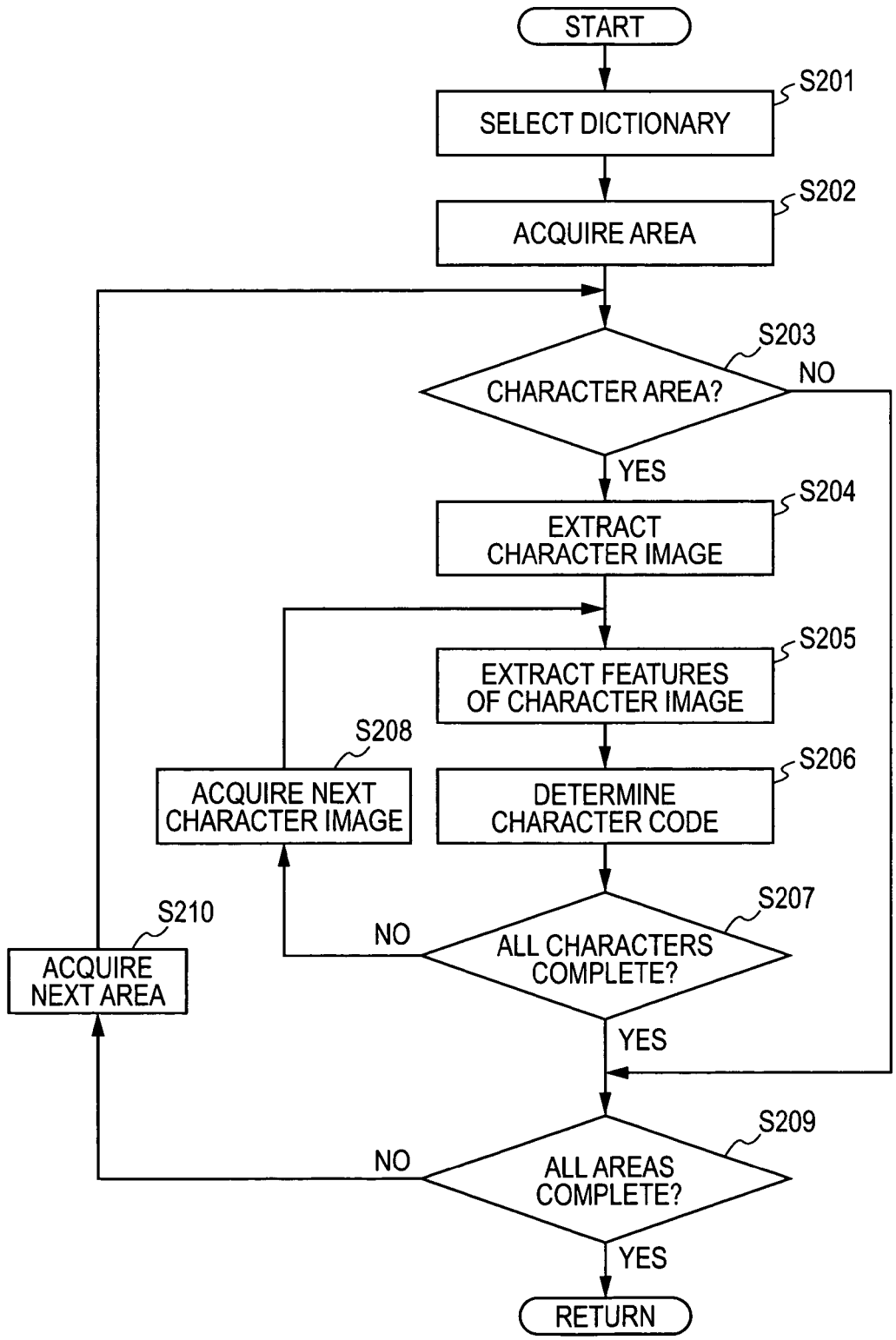
FIG. 8 shows a flowchart of a character recognition process.

In step S103, character recognition is performed on the images divided by the region segmentation described above. FIG. 8 is a flowchart showing the character recognition according to this exemplary embodiment.

In step S201, a language currently used in the user interface 6 is determined, and a language dictionary suitable for recognizing the determined language is selected.

Since the user interface shown in FIG. 3 is displayed in Japanese, dictionary data suitable for recognizing Japanese characters (e.g., dictionary data storing the features of characters defined in the Japanese industrial standards (JIS)) is selected. In the case in which the user interface is displayed in English, as shown in FIG. 9, dictionary data suitable for recognizing English characters (e.g., dictionary data storing the features of characters defined in Latin 1) is selected.

In the case in which the user interface is described in an East European language (e.g., Hungarian, Slovene), dictionary data storing the features of characters defined in Latin 2 is selected. In the case in which the user interface is described in a North European language (e.g., Baltic), dictionary data storing the features of characters defined in Latin 4 is selected.

As described above, with respect to the image processing apparatus, in accordance with the language used in displaying the user interface for performing various settings, such as instructions to perform copying, scanning, sending, or the like, appropriate dictionary data is selected.

In step S202, a target area to be first processed is acquired.

In step S203, it is determined whether the target area includes a character attribute, such as a text attribute, a title attribute, a table attribute containing a character, or the like, (whether the target area includes a character image). If the target area is determined to include the character image, the processing moves to step S204. If not, the processing skips to step S209.

In step S204, the character image is extracted from the target area.

Figure 10:
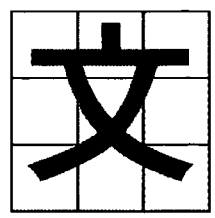
FIG. 10 shows an example of a feature extraction of a kanji character.
Figure 12:
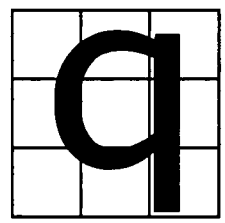
FIG. 12 shows an example of a feature extraction of an English alphabet character.

In step S205, the features of the extracted character image are extracted. FIGS. 10 and 12 show an extraction of the features of a character. FIG. 10 shows an example of a kanji character, and FIG. 12 shows an example of an English alphabet character. The rectangular character image is subdivided into a matrix of rectangular blocks (e.g., 3×3), and the features of pixel elements of the subdivided images are calculated. From the calculated features of all subdivided images, the features of the character image are determined.

Figure 11:
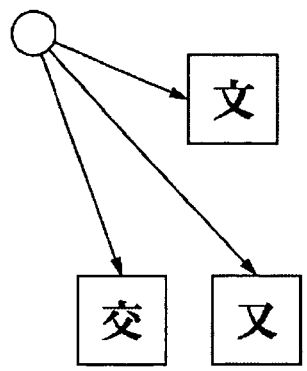
FIG. 11 illustrates a comparison of calculated distance values for an example of the kanji character.
Figure 13:
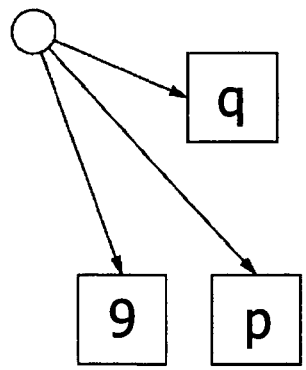
FIG. 13 illustrates a comparison of calculated distance values for an example of the English alphabet character.

In step S206, the features of the character image obtained in step S205 are compared with the amount of features of characters stored in the dictionary data selected in step S201, and a distance value indicating the degree of similarity between the features of the character image and that of each character is then calculated. From the calculated distance value, a character that is most similar to the target character image is determined to be a candidate as a result of character recognition. In this case, a character that has the smallest distance value is determined to be the most similar candidate as a result of character recognition. FIGS. 11 and 13 show an example of the calculated distance value from the target character image to each character, using vectors. Determining a candidate as a result of character recognition with respect to each character image, as is performed in steps S205 and S206, is not limited to the technique described above. Various other techniques, such as a technique of obtaining a result of character recognition by pattern matching in which a pattern of the character image is compared with patterns stored in the dictionary data, are applicable.

In step S207, it is determined whether character candidates (character codes) for all character images in the target area have been determined. If the determination for all character images completes, the processing moves to step S209. If a character image that has not been processed remains in the target area, the processing moves to step S208 and the next character image is acquired. Processing then returns to step S205 and is repeated for the newly acquired character image.

In step S209, it is determined whether the determination for all areas obtained by region segmentation has been completed. If an area to be processed remains, the processing moves to step S210 and the next area to be processed is acquired. Then, processing returns to step S203 and processing is repeated for the newly acquired area. If it is determined that all areas have been complete, the character recognition process is ended and processing returns to FIG. 2.

Each of the character codes obtained by the character recognition shown in FIG. 8, as described above, is stored so as to be associated with position information for each character image.

In step S104 of FIG. 2, the resolution of the read original image data is set at a resolution specified with the user interface. Further, in this exemplary embodiment, the image data is subjected to compression, such as Joint Photographic Experts Group (JPEG) compression. However, the processing may move to the next step without performing such compression (e.g., JPEG compression). In this case, bitmap image data is subjected to the next processing.

In step S105, the character codes obtained by the character recognition in step S103 are linked to the image data obtained by step S104 (are embedded as transparent text) in accordance with the position information, and the image data is then output as a file in the searchable PDF format. The output file is sent to a specified address.

As described above, according to this exemplary embodiment, performing character recognition on image data obtained by scanning or the like and creating a file in the format in which the image data has text information associated with position information of each character image realize creating an image file that allows a user to perform retrieval by using a character. This facilitates manipulation and reuse of image data, thus increasing the added value of an image processing apparatus having a scanner (e.g., a copier).

Additionally, in accordance with a language that has been set so as to be used in the user interface of the image processing apparatus, character recognition suitable for recognizing character images described in the language is automatically performed. This eliminates the inconvenience of setting language information by a user.

In the exemplary embodiment described above, the copier (MFP) having a printer is used. However, the image processing apparatus may be a scanning apparatus in which the output unit 5 has no printer and data can be sent to an external device over a network.

Although a dictionary suitable for each language is selected in step S201, another item may be selected as long as a recognizing method suitable for a language used in an operating screen can be selected. For example, in addition to the dictionary, a recognizing algorithm may be changed to that suitable for each language.

Second Embodiment

Moreover, the user interface in the first embodiment may have a system for automatically selecting a Japanese user interface, as shown in FIG. 3, and an English user interface, as shown in FIG. 9, according to a user using the image processing apparatus. In this case, for example, a login screen may appear when a user starts using the image processing apparatus, so that the user interface can be automatically selected according to the login user.

Third Embodiment

Furthermore, the user interface in the first embodiment shown in FIGS. 3 and 9 may have an option screen for specifying the type of a language of a document by a user (a user specification for the type of a language of a document). In this case, in step S201, it is first determined whether the user specifies the type of the language of the document image on the option screen. If the user is determined to specify it, a dictionary suitable for recognizing a document of the specified type of the language is selected, and then step S202 and the subsequent steps are performed. If the user is determined not to specify the type of the language of the document image on the option screen, as is the case with the first embodiment, a language currently used in displaying the user interface is determined, a dictionary suitable for recognizing characters of the determined language is then selected, and step S202 and the subsequent steps are performed.

This structure realizes the same advantages as those in the first embodiment. In addition, even when a document described in a different language from that used in the user interface is read, character recognition suitable for the different language can be performed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:
1. An image processing apparatus to support image processing in multiple languages, the image processing apparatus comprising:
    a user interface configured to set an instruction from a user for various functions performed by the image processing apparatus, wherein the user interface displays characters in a language;

a determining unit configured to automatically determine the language currently used for the characters displayed in the user interface of the various functions;

a setting unit configured to set, in response to the determining unit automatically determining the language currently used for the characters displayed in the user interface, the determined language as a scanned document language for use in recognizing characters in a scanned document which is obtained by scanning a paper document; and a character recognizing unit configured to utilize the scanned document language set by the setting unit to recognize characters in the scanned document and create text data.

2. The image processing apparatus according to claim 1, further comprising:

a file creating unit configured to create a file in which the text data created by the character recognizing unit and the scanned document obtained by scanning the paper document are associated with each other.

3. The image processing apparatus according to claim 1, further comprising:

an option user interface configured to optionally set a user specification for specifying the scanned document language, wherein the determining unit further is configured to determine whether the option user interface sets the user specification for specifying the scanned document language, and wherein, in response to the determining unit determining that the option user interface sets the user specification for specifying the scanned document language, the setting unit sets the language specified based on the user specification as the scanned document language for use in recognizing characters in the scanned document.

4. The image processing apparatus according to claim 3, wherein, in response to the determining unit determining that the option user interface does not set the user specification, the determining unit automatically determines the language currently used for the characters displayed in the user interface, and the setting unit sets the determined language as the scanned document language for use in recognizing characters in the scanned document.

5. The image processing apparatus according to claim 1, further comprising:

a switching unit configured to automatically switch the language currently used for the characters displayed in the user interface from a first language to a second language, wherein the determining unit further is configured to determine whether the switching unit automatically switched the language used in displaying the characters of the user interface from the first language to the second language, and wherein, in response to the determining unit determining that the switching unit automatically switched the language currently used in displaying the characters of the user interface from the first language to the second language, the setting unit sets the second language as the scanned document language for use in recognizing characters in the scanned document.

6. The image processing apparatus according to claim 5, wherein, in response to the determining unit determining that the switching unit did not switch the language used in displaying the characters of the user interface from the first language to the second language, the determining unit automatically determines a language currently used for the characters displayed in the user interface, and the setting unit sets the determined language as the scanned document language for use in recognizing characters in the scanned document.

7. The image processing apparatus according to claim 5, wherein the switching unit is configured to automatically switch the language currently used for the characters displayed in the user interface from the first language to the second language in response to receiving a request from the user to switch the language currently used for the characters displayed in the user interface.

8. The image processing apparatus according to claim 5, wherein the switching unit is configured to automatically switch the language currently used for the characters displayed in the user interface from the first language to the second language in response to a login profile of a user specifying the second language as a language to use for the characters displayed in the user interface.

9. The image processing apparatus according to claim 5, further comprising:

an option user interface configured to optionally set a user specification for specifying the scanned document language, wherein the determining unit further is configured to determine whether the option user interface sets the user specification for specifying the scanned document language, and wherein, in response to the option user interface not setting the user specification and the determining unit determining that the switching unit automatically switched the language currently used for the characters displayed in the user interface from the first language to the second language, the setting unit sets the second language as the scanned document language for use in recognizing characters in the scanned document.

10. The image processing apparatus according to claim 1, wherein the determining unit further is configured to determine whether the user utilized the user interface prior to using the user interface to engage in a process directly related to obtaining image data by scanning the paper document, and wherein, in response to the determining unit determining that the user utilized the user interface prior to using the user interface to engage in a process directly related to obtaining image data by scanning the paper document, the setting unit sets, as the scanned document language for use in recognizing characters in the scanned document, the language currently used for the characters displayed in the user interface prior to the user using interface to engage in a process directly related to obtaining image data by scanning the paper document.

11. The image processing apparatus according to claim 1, wherein the determining unit further is configured to determine a language that was used for the characters displayed in the user interface during a time in which the user utilized the user interface to engage in a process directly related to obtaining image data by scanning the paper document, and wherein the setting unit sets the determined language used in displaying the characters of the user interface as the scanned document language for use in recognizing characters in the scanned document.

12. The image processing apparatus according to claim 1, wherein the character recognizing unit utilizes the scanned document language set by the setting unit to recognize characters in the scanned document by selecting dictionary data based on the scanned document language set by the setting unit.

13. The image processing apparatus according to claim 1, wherein the user interface further includes at least one of a touch panel, a display screen, and one or more mechanical buttons.

14. The image processing apparatus according to claim 1, wherein the user interface configured to display characters in at least one of Japanese, English, an East European language, and a North European language, the image processing apparatus further comprising:
   a frame, wherein the user interface and an image reading unit are coupled to the frame.

15. The image processing apparatus according to claim 1, further comprising:
   a central processing unit configured to binarize the image data, reduce noise in the binarized image data, and then perform region segmentation on the binarized image data by dividing the binarized image data into attribute areas that include at least one of a character area and image area, wherein the character recognizing unit utilizes the scanned document language set by the setting unit to recognize characters in the character area and creates the text data.

16. The image processing apparatus according to claim 1, wherein the various functions include at least one of the copying function, a scanning function, and a sending function.

17. A method for an image processing apparatus to support image processing in multiple languages, the method comprising the steps of:
   setting an instruction received in a user interface from a user for various functions performed by the image processing apparatus, wherein the user interface displays characters in a language;
   automatically determining a language currently used for the characters displayed in the user interface of the various functions;
   setting, in response to automatically determining the language currently used for the characters displayed in the user interface, the determined language as a scanned document language for use in recognizing characters in a scanned document which is obtained by scanning a paper document; and
   utilizing the set scanned document language to recognize characters in the scanned document and create text data.

18. The method according to claim 17, further comprising:
   creating a file in which the created text data and the scanned document are associated with each other.

19. The method according to claim 17, the method further comprising a step of optionally setting a user specification received in an option user interface for specifying the scanned document language, wherein, in response to it being determined in the determining step that the user specification is set in the option user interface, the setting step includes setting the language specified based on the user specification as the scanned document language for use in recognizing characters in the scanned document.

20. A non-transitory computer-readable storage medium storing a program that causes an image processing apparatus to perform the method according to claim 17.

\* \* \* \* \*